(12) United States Patent
Braillard

(10) Patent No.: US 10,749,190 B2
(45) Date of Patent: Aug. 18, 2020

(54) FUEL CELL COMPRISING HEATING PLATES AND FACILITY COMPRISING SUCH A CELL

(71) Applicant: COMPAGNIE GENERALE DES ETABLISSEMENTS MICHELIN, Clermont-Ferrand (FR)

(72) Inventor: Vincent Braillard, Clermont-Ferrand (FR)

(73) Assignee: Compagnie Generale Des Etablissements Michelin, Clermont-Ferrand (FR)

( * ) Notice: Subject to any disclaimer, the term of this patent is extended or adjusted under 35 U.S.C. 154(b) by 168 days.

(21) Appl. No.: 15/775,610

(22) PCT Filed: Nov. 23, 2016

(86) PCT No.: PCT/EP2016/078589
§ 371 (c)(1),
(2) Date: May 11, 2018

(87) PCT Pub. No.: WO2017/089419
PCT Pub. Date: Jun. 1, 2017

(65) Prior Publication Data
US 2018/0351183 A1 Dec. 6, 2018

(30) Foreign Application Priority Data
Nov. 23, 2015 (FR) ...................... 15 61240

(51) Int. Cl.
*H01M 8/0267* (2016.01)
*H01M 8/04014* (2016.01)
(Continued)

(52) U.S. Cl.
CPC ....... *H01M 8/0267* (2013.01); *H01M 8/0258* (2013.01); *H01M 8/04014* (2013.01);
(Continued)

(58) Field of Classification Search
CPC .......................... H01M 8/0267; H01M 8/0258
See application file for complete search history.

(56) References Cited

U.S. PATENT DOCUMENTS

| 2005/0079397 A1 | 4/2005 | Winkelmann et al. ......... 429/26 |
| 2005/0095485 A1* | 5/2005 | Saulsbury ........... H01M 8/0206 429/430 |

(Continued)

FOREIGN PATENT DOCUMENTS

FR    2 945 377 A1    11/2010

OTHER PUBLICATIONS

International Search Report issued by WIPO dated Dec. 22, 2016, in connection with International Application No. PCT/EP2016/078589 (in English).

(Continued)

*Primary Examiner* — Olatunji A Godo
(74) *Attorney, Agent, or Firm* — Venable LLP

(57) ABSTRACT

A fuel cell includes a stack and heating plates sandwiching the stack. The stack is formed of a set of electrochemical generators superimposed along a stacking axis. The heating plates are located axially on each side of the set. Each heating plate includes cavities and orifices for accessing the cavities. The fuel cell may be incorporated in a facility that includes a source of pressurized gas, which is linked to the orifices of the heating plates, and a device for managing a supply process for supplying gas to the cavities from the source of pressurized gas and an evacuation process for evacuating gas from the cavities.

8 Claims, 2 Drawing Sheets

(51) Int. Cl.
    *H01M 8/04746* (2016.01)
    *H01M 8/0432* (2016.01)
    *H01M 8/04089* (2016.01)
    *H01M 8/04007* (2016.01)
    *H01M 8/0258* (2016.01)
    *H01M 8/04082* (2016.01)
    *H01M 8/1018* (2016.01)
    *H01M 8/065* (2016.01)

(52) U.S. Cl.
    CPC ..... *H01M 8/0432* (2013.01); *H01M 8/04074* (2013.01); *H01M 8/04089* (2013.01); *H01M 8/04216* (2013.01); *H01M 8/04753* (2013.01); *H01M 8/04768* (2013.01); *H01M 8/04776* (2013.01); *H01M 8/065* (2013.01); *H01M 2008/1095* (2013.01); *H01M 2250/20* (2013.01); *Y02T 90/32* (2013.01)

(56) References Cited

U.S. PATENT DOCUMENTS

| | | |
|---|---|---|
| 2006/0051638 A1 | 3/2006 | Gross .............................. 429/26 |
| 2008/0268303 A1* | 10/2008 | Eickhoff ........... H01M 8/04208 429/410 |
| 2012/0088175 A1 | 4/2012 | Oriol ............................ 429/435 |
| 2017/0324105 A1 | 11/2017 | Braillard et al. . H01M 8/04768 |
| 2017/0338501 A1 | 11/2017 | Paganelli et al. .......................... H01M 8/04835 |
| 2017/0352895 A1 | 12/2017 | Braillard et al. ....... H01M 8/04 |
| 2017/0352896 A1 | 12/2017 | Braillard et al. . H01M 8/04029 |

OTHER PUBLICATIONS

Written Opinion published by WIPO dated Jun. 1, 2017, in connection with International Application No. PCT/EP2016/078589 (in French; presently no English translation is available).

\* cited by examiner

FUEL CELL COMPRISING HEATING PLATES AND FACILITY COMPRISING SUCH A CELL

FIELD OF THE INVENTION

The present invention relates to the field of fuel cells, in particular to the field of fuel cells that are able to be used in motor vehicles.

RELATED ART

A fuel cell makes it possible to generate electrical energy through an electrochemical reaction based on a fuel, generally hydrogen, and on a combustion agent, generally oxygen.

A fuel cell of solid-electrolyte proton-exchange membrane type (PEMFC) normally comprises a stack of elementary cells, in the form of plates, forming electrochemical generators, each of the cells being separated from the adjacent cells by bipolar plates. Each cell comprises an anode element and a cathode element, separated by a solid electrolyte in the form of an ion-exchange membrane that is made for example from a perfluorinated sulfurated polymeric material. According to one common variant embodiment, each bipolar plate provides, on one side, the supply of fuel to the cell adjacent to this side and, on the other side, the supply of combustion agent to the cell adjacent to this other side, the supplies provided by the bipolar plates being carried out in parallel.

The stack furthermore comprises current collector plates that are positioned at the ends of the stack of elementary cells and of unipolar plates, and also end terminal plates for securing the assembly.

The current collector plates are generally solid and are made of copper so as to provide good electrical conductivity.

BRIEF DESCRIPTION OF EMBODIMENTS OF THE INVENTION

When the fuel cell is cold-started, for example at temperatures lower than minus ten degrees Celsius, the operation of the cells close to the collector plates is adversely affected by the thermal inertia of these collector plates. There is then a risk of gelling of the water produced during the cold start, which may be reflected in a lower voltage that is even zero or negative, leading to a risk of failure of the starting and of irreversible damage to the cell.

The aim of the present invention is in particular to improve the cold-starting of fuel cells.

According to one embodiment, what is proposed is a fuel cell comprising a stack including a set of electrochemical generators superimposed along a stacking axis, and, axially on either side of said set, heating plates having cavities and orifices for accessing these cavities.

Said heating plates may form current collector plates.

Said heating plates may be adjacent to current collector plates that are situated axially on either side of said set.

Said access orifices may be linked to solenoid valves.

Said cavities may be able to contain a hydride.

Said heating plates are inserted into electrically insulating plates.

What is also proposed is a facility that comprises said fuel cell and furthermore comprising a pressurized gas source linked to said orifices of said heating plates and a device for managing the supply to said cavities from this gas source and the evacuation of the gas from these cavities.

The management device may comprise at least one solenoid valve and an electronic unit for managing the opening/closure of this solenoid valve on the basis of the value of a measured temperature signal.

The gas source may be linked to said fuel cell successively by a high-pressure expansion valve and a low-pressure expansion valve.

The management device may comprise a first solenoid valve linked firstly to the junction between said high-pressure expansion valve and said low-pressure expansion valve and secondly to said orifices of said cavities, a second solenoid valve linked firstly to the junction between said low-pressure expansion valve and said set of electrochemical generators and secondly to said orifices of said cavities, and an electronic unit for managing the opening/closure of said solenoid valves, able to bring about cycles successively comprising the opening of the first solenoid valve, the closure of the first solenoid valve, the opening of the second solenoid valve and the closure of the second solenoid valve.

The electronic management unit may be able to bring about the opening of the first solenoid valve for a predetermined duration and to bring about the closure of the second solenoid valve for a predetermined duration.

The facility may comprise a temperature sensor linked to the electronic management unit, the latter being able to bring about, when the fuel cell is put into operation, at least one cycle if the temperature signal originating from said temperature sensor is lower than a predetermined value.

The gas source may be a hydrogen source and said cavities in said heating plates contain at least one material that is able to absorb/desorb the hydrogen.

What is also proposed is a method for operating a fuel cell comprising a stack including a set of electrochemical generators superimposed along a stacking axis, and, axially on either side of said set, heating plates having cavities and orifices for accessing these cavities, these cavities containing a hydride.

This method is such that, if the value of a temperature signal is lower than a predetermined threshold and a request to start the fuel cell is made, in a first step, said cavities are supplied with highly pressurized hydrogen, such that the hydrogen is absorbed by the hydride, and then, in a second step, the cavities are put under a low pressure so that the hydrogen desorbs.

The first step and the second step may be implemented for predetermined durations.

BRIEF DESCRIPTION OF THE DRAWINGS

A fuel cell, a facility including this cell and operation of such a facility will now be described by way of nonlimiting examples, illustrated by the appended drawing, in which.

DETAILED DESCRIPTION OF EMBODIMENTS OF THE INVENTION

Figure 1:
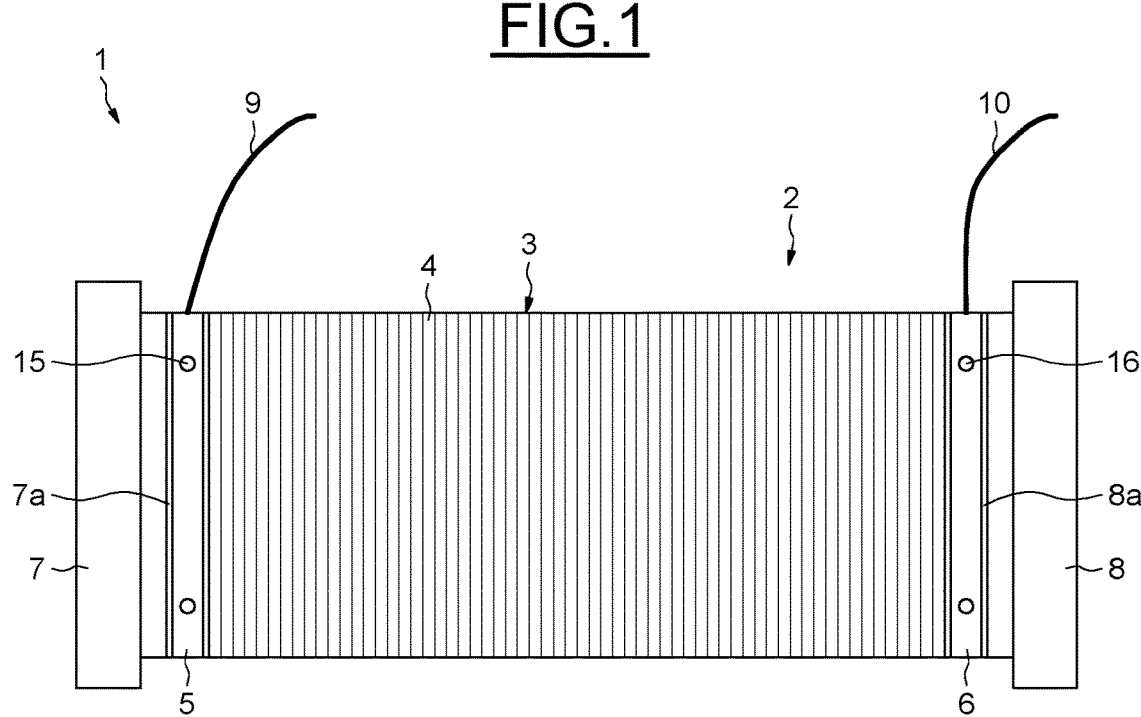
FIG. 1 shows an external view of a fuel cell.

As illustrated schematically in FIG. 1, a fuel cell 1 in particular comprises a stack 2 formed, along a stacking axis, of a set 3 of electrochemical generators 4 that are superimposed, electrically in series, and of electric current collector plates 5 and 6 that are situated axially on either side of the set 3 and attached to the end radial faces of this set 3.

The stack 2 furthermore comprises assembly terminal plates 7 and 8 that are adjacent to the current collector plates 5 and 6 and electrically insulated from the latter by insulating plates 7a and 8a. The stack 2 is held together by compression means (not shown), such as tie rods for example.

The collector plates 5 and 6 are linked to external electrical cables 9 and 10 in order to deliver the electric current produced by the set 3 of electrochemical generators 4.

In a manner known per se, each electrochemical generator 4 comprises plates forming an anode, an electrolyte and a cathode (not shown) for producing electric current under the effect of a fuel, generally hydrogen, and of a combustion agent, generally oxygen. Also in a manner known per se, the fuel cell 1 has channels (not shown) allowing the fuel and the combustion agent to flow.

Figure 2:
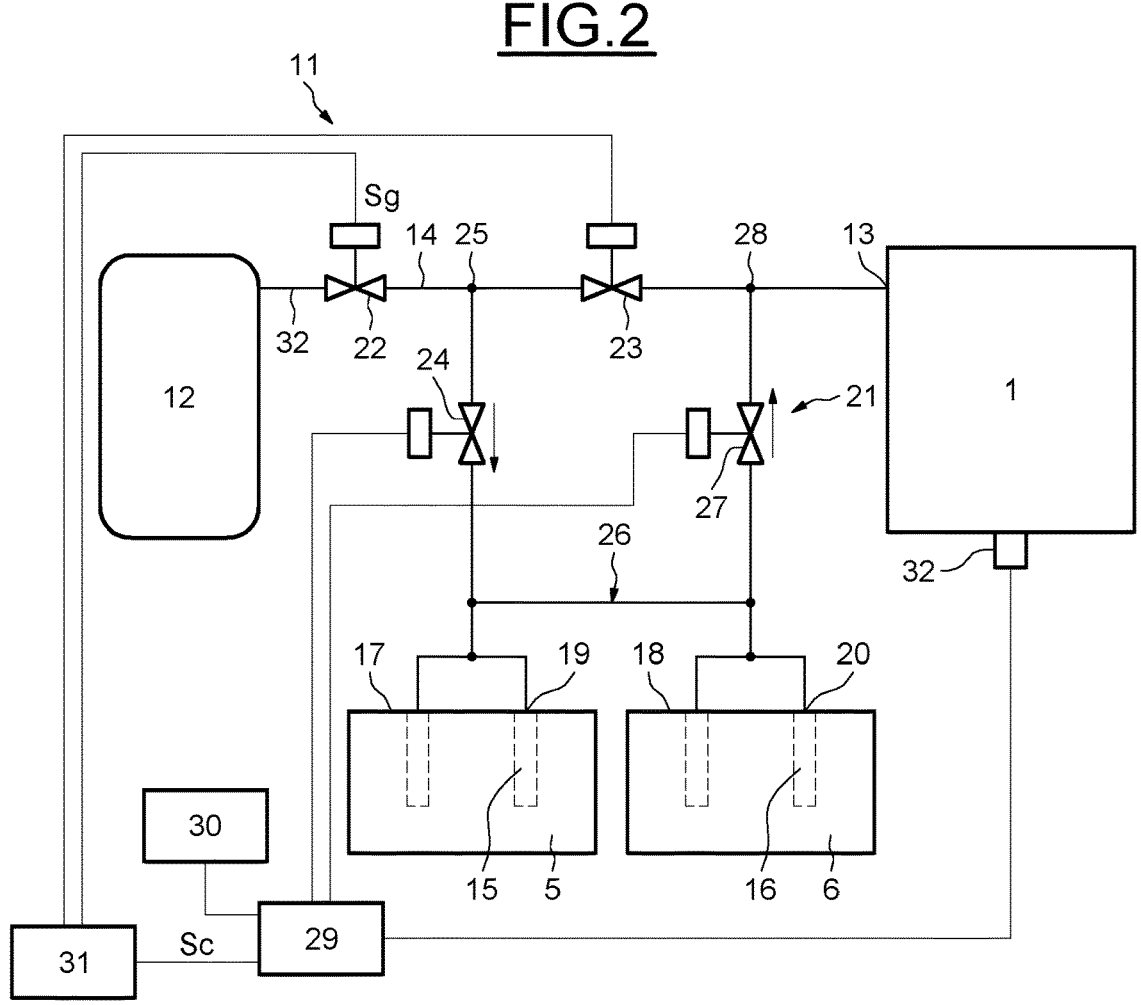
FIG. 2 shows a facility including the fuel cell of FIG. 1.

As illustrated in FIG. 2, a facility 11 comprises the fuel cell 1 and a hydrogen gas source 12 linked to an inlet 13 of the fuel cell 1 via a supply conduit 14 and able to supply hydrogen to the electrochemical generators 4.

The collector plates 5 and 6 have, respectively, blind holes 15 and 16 produced parallel to the main faces of these collector plates 5 and 6, starting from one of the fields 17 and 18 of these plates. These holes 15 and 16 form cavities, and their inlet orifices 19 and 20 in these fields 17 and 18 form orifices for accessing these cavities. Advantageously, each collector plate may have for example two blind holes that are parallel and spaced apart.

The blind holes 15 and 16 are at least partly filled with a hydride in powder or grain form that is able, under suitable conditions, to absorb the hydrogen while producing heat and to desorb the previously absorbed hydrogen. For example, this hydride may have a composition of $LaNi_5H_7$ or $NaAlH_6$ type.

The facility 11 comprises a device 21 for managing the supply to the blind holes 15 and 16 of the collector plates 5 and 6 from the hydrogen source 12 and the evacuation of the hydrogen.

The management device 21 comprises, on the supply conduit 14 and between the hydrogen source 12 and the inlet 13 of the fuel cell 1, a high-pressure expansion valve 22 and then a low-pressure solenoid valve 23 forming a low-pressure expansion valve.

The management device 21 comprises a first solenoid valve 24 linked firstly to a junction 25 of the conduit 14, which junction is situated between the high-pressure expansion valve 22 and the low-pressure solenoid valve 23, and secondly to a system 26 of conduits that are linked to the access orifices 19 and 20 and connecting the blind holes 15 and 16 of the collector plates 5 and 6 in parallel.

The management device 21 also comprises a second solenoid valve 27 linked firstly to a junction 28 of the conduit 14, which junction is situated between the low-pressure solenoid valve 23 and the hydrogen inlet 13 of the fuel cell 1, and secondly to the system of conduits 26.

The management device 21 furthermore comprises an electronic unit 29 that is subject to a temperature sensor 30 able to sense the ambient temperature, for example. The electronic unit 29 is able to deliver signals for opening/closing the solenoid valves 24 and 28.

The electronic unit 29 is also subject to a control signal Sc originating from a general electronic unit 31 for driving the facility 11. This general electronic unit 31 is able to deliver a signal Sg for opening/closing a solenoid valve 22 that is mounted on the supply conduit 14 between the hydrogen source 12 and the high-pressure expansion valve 22.

The facility 11 may operate as follows.

In an initial state, the pressure in the pressure source 12 may be around 350 bar. The solenoid valves 24, 28 and 22 are in the closed state F. The fuel cell is at ambient temperature, for example.

Upon a command from an operator or from an automatic controller, the general electronic unit 31 puts the fuel cell 1 into operation. More particularly, the general electronic unit 31 sends an opening signal to the solenoid valve 22, which opens. The source 12 delivers hydrogen to the inlet 13 of the fuel cell 1 via the supply conduit 14, via the high-pressure expansion valve 22 and the low-pressure solenoid valve 23, the oxygen being delivered by means that are not shown.

The fuel cell 1 is thus put into operation. Its temperature rises. In what is termed normal operation, the temperature in particular of the set 2 of electrochemical cells 4 of the fuel cell 1 may be around 75° C.

By way of example, the pressure at the output of the high-pressure expansion valve may be around 10 bar, and the pressure at the output of the low-pressure solenoid valve may be set to around 2 bar absolute.

At the same time as it sends the opening signal to the solenoid valve 22, the general electronic unit 31 sends the control signal Sc to the electronic unit 29.

The electronic unit 29 is programmed to operate as follows.

Figure 3:
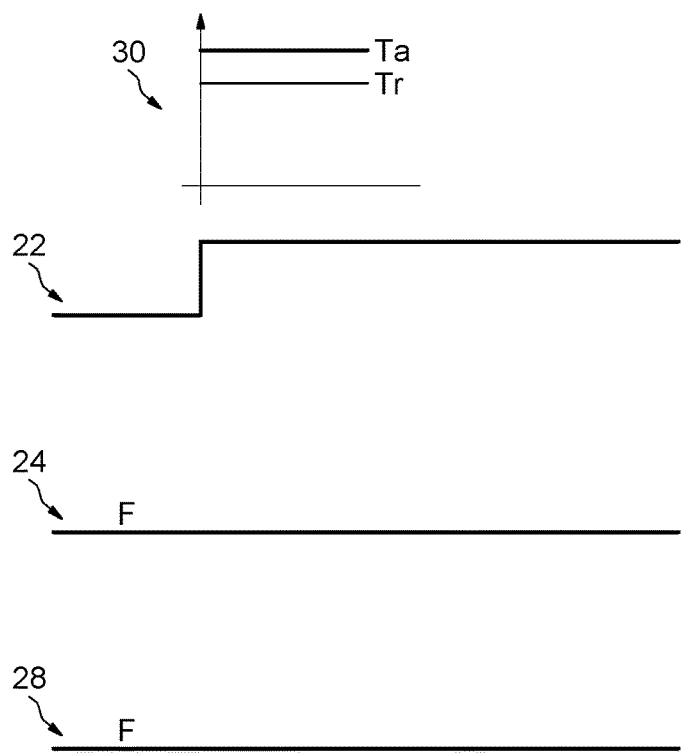
FIG. 3 shows a diagram of one mode of operation of the facility of FIG. 2.

As illustrated in FIG. 3, if the value of the temperature signal originating from the ambient temperature sensor 30 is greater than a predetermined threshold Tr, which value is measured at the starting time, the electronic unit 29 keeps the solenoid valves 24 and 28 in the closed state F. For example, this threshold Tr may be set at minus ten degrees Celsius (−10° C.).

The fuel cell 1 continues its operation normally.

Figure 4:
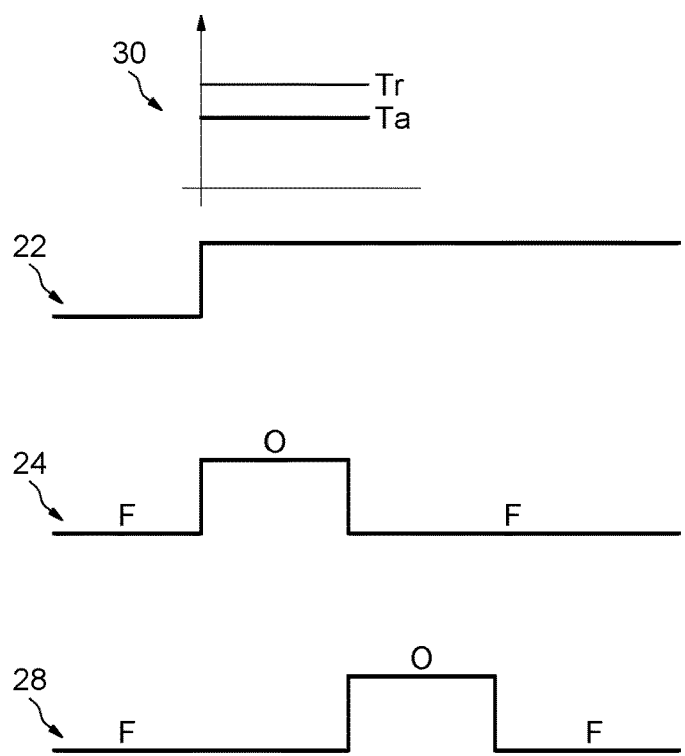
FIG. 4 shows a diagram of another mode of operation of the facility of FIG. 2.

As illustrated in FIG. 4, in a first step, if on the other hand the value of the temperature signal originating from the ambient temperature sensor 30 is lower than said predetermined threshold Tr, the electronic unit 29 sends an opening signal to the solenoid valve 24, which immediately changes to the open state O, while at the same time keeping the solenoid valve 28 in the closed state F.

In doing so, hydrogen, at the high outlet pressure Ph of the high-pressure expansion valve 22, is injected into the holes 15 and 16 of the collector plates 5 and 6, and the pressure in the holes 15 and 16 will establish itself at the high pressure Ph. The injected hydrogen is absorbed by the hydrides contained in these holes 15 and 16. With this absorption being exothermic, the collector plates 5 and 6 are heated rapidly, and the heat produced is transferred, gradually, to the plates forming the cells 4 of the set 2.

This heating upon starting of the fuel cell 1 enables the latter to be put into operation immediately, without damaging it.

At the end of a programmed predetermined period, in a second step, the electronic unit 29 sends a closure signal to the solenoid valve 24, which changes to the closed state F and sends an opening signal to the solenoid valve 28, which changes to the open state O.

In doing so, with the holes 15 and 16 then being set to the low outlet pressure Pb of the low-pressure solenoid valve 23, the previously absorbed hydrogen is desorbed from the hydrides contained in the holes 15 and 16 and is delivered, in the supply conduit 14, to the inlet 13 of the fuel cell 1.

At the end of a programmed predetermined period, the electronic unit 29 sends a closure signal to the solenoid valve 28, which changes to the closed state F.

The fuel cell 1 continues its operation normally.

The operation of the facility 11 that has just been described may be repeated each time this facility is started up.

According to one variant embodiment, the electronic unit 29 may furthermore be subject to a signal originating from a temperature sensor 32 sensitive to the temperature of the fuel cell 1.

The electronic unit 29 is programmed so that, if the value of the signal delivered by this temperature sensor 32 is greater than a threshold Tr1, the operation of the facility 11 corresponds to that described with reference to FIG. 3, regardless of the signal originating from the temperature detector 30. For example, this threshold Tr1 may be set at minus ten degrees Celsius (−10° C.). The thresholds Tr and Tr1 may however be set at different values.

If on the other hand the value of the signal delivered by this temperature sensor 32 is lower than the threshold Tr1, and the value of the temperature signal originating from the ambient temperature sensor 30 is lower than said predetermined threshold Tr, then the operation of the facility corresponds to that described with reference to FIG. 4.

According to another variant embodiment, the electronic unit 29 might be subject to just the temperature sensor 32.

According to one variant embodiment, the collector plates 5 and 6 may be inserted into plate recesses made of an electrically insulating material, having portions extending between the collector plates 5 and 6 and the assembly terminal plates 7 and 8.

According to one variant embodiment, the abovementioned cavities receiving the hydrides could be provided in additional plates adjacent or attached to current collector plates 5 and 6 not having the holes 15 and 16, these additional plates being positioned between these collector plates and the insulating plates 7a and 8a or between these collector plates and the set 3 of electrochemical generators 4.

According to one variant embodiment, the hydrogen injected into the cavities 15 and 16 could come from a suitable auxiliary source other than the source 12, and the hydrogen desorbed via the solenoid valve 27 could not be injected at the inlet 13 of the fuel cell 1, but could be evacuated in order to be recycled to another suitable means.

The invention claimed is:

1. A fuel-cell system comprising:
a fuel cell;
a source of pressurized gas; and
a control system,
wherein the fuel cell includes:
a stack that includes a set of electrochemical generators superimposed along a stacking axis, and
a heating plate located axially on each side of the set of electrochemical generators to sandwich the set of electrochemical generators therebetween, each of the heating plates including cavities and orifices for accessing the cavities, the cavities being blind holes at least partially filled with a hydride that is able to absorb hydrogen while producing heat and to desorb the hydrogen previously absorbed;
wherein the source of pressurized gas is linked to the orifices of the heating plates,
wherein the source of pressurized gas is linked to the fuel cell by a supply conduit comprising in a successive order a high-pressure expansion valve and a low-pressure expansion valve,
wherein the control system manages an operation to supply gas to the cavities from the source of pressurized gas, and an operation to evacuate gas from the cavities, and
wherein the control system includes:
a first solenoid valve linked to:
a first junction of the supply conduit between the high-pressure expansion valve and the low-pressure expansion valve, and
a system of conduits that are linked to the orifices and connect the blind holes of the heating plate in parallel,
a second solenoid valve linked to:
a second junction of the supply conduit between the low-pressure expansion valve and the set of electrochemical generators, and
the system of conduits, and
an electronic controller that manages an opening and closing procedure for the first and second solenoid valves, the procedure including successively causing an opening of the first solenoid valve, a closing of the first solenoid valve, an opening of the second solenoid valve, and a closing of the second solenoid valve.

2. The fuel-cell system according to claim 1, wherein, in the procedure managed by the electronic controller, the first solenoid valve remains in an opened state for a predetermined duration, and the second solenoid valve remains in a closed state for a predetermined duration.

3. The fuel-cell system according to claim 1, further comprising a temperature sensor linked to the electronic controller, wherein when the fuel cell is in operation the electronic controller controls an occurrence of at least one process cycle if a temperature signal originating from the temperature sensor is lower than a predetermined value.

4. The fuel-cell system according to claim 1,
wherein the source of pressurized gas is a hydrogen source.

5. A method for operating a fuel cell system comprising:
a fuel cell;
a source of pressurized gas; and
a control system,
wherein the fuel cell includes:
a stack that includes a set of electrochemical generators superimposed along a stacking axis, and
a heating plate located axially on each side of the set of electrochemical generators to sandwich the set of electrochemical generators therebetween, each of the heating plates including cavities and orifices for accessing the cavities, the cavities being blind holes at least partially filled with a hydride that is able to absorb hydrogen while producing heat and to desorb the hydrogen previously absorbed;
wherein the source of pressurized gas is linked to the orifices of the heating plates,
wherein the source of pressurized gas is linked to the fuel cell by a supply conduit comprising in a successive order a high-pressure expansion valve and a low-pressure expansion valve,
wherein the control system manages an operation to supply gas to the cavities from the source of pressurized gas, and an operation to evacuate gas from the cavities, and wherein the control system includes:
  a first solenoid valve linked to:
    a first junction of the supply conduit between the high-pressure expansion valve and the low-pressure expansion valve, and
    a system of conduits that are linked to the orifices and connect the blind holes of the heating plate in parallel,
  a second solenoid valve linked to:
    a second junction of the supply conduit between the low-pressure expansion valve and the set of electrochemical generators, and
    the system of conduits, and
  an electronic controller that manages an opening and closing procedure for the first and second solenoid valves, the procedure including successively causing an opening of the first solenoid valve, a closing of the first solenoid valve, an opening of the second solenoid valve, and a closing of the second solenoid valve the method comprising steps of:

if a value of a temperature signal is lower than a threshold value, supplying the cavities with pressurized hydrogen, such that hydrogen is absorbed by the hydride in the cavities; and desorbing the hydrogen from the hydride in the cavities by exposing the cavities to a low-pressure environment.

6. The method according to claim 5,
wherein the supplying step is implemented for a predetermined duration, and
wherein the desorbing step is implemented for a predetermined duration.

7. The fuel-cell system according to claim 1, wherein each heating plate is a current collector plate.

8. The fuel-cell system according to claim 1, wherein the fuel cell further comprises a current collector plate located axially on each side of the set of electrochemical generators, and wherein the heating plates are positioned adjacent to the current collector plates, respectively.

* * * * *